July 12, 1949.  R. V. CRADDOCK ET AL  2,475,593
SELF-SYNCHRONOUS FLUX VALVE SYSTEM
Filed Aug. 28, 1945  2 Sheets-Sheet 1

INVENTORS:
REGINALD V. CRADDOCK
ROBERT S. CURRY, JR.
BY
ATTORNEY.

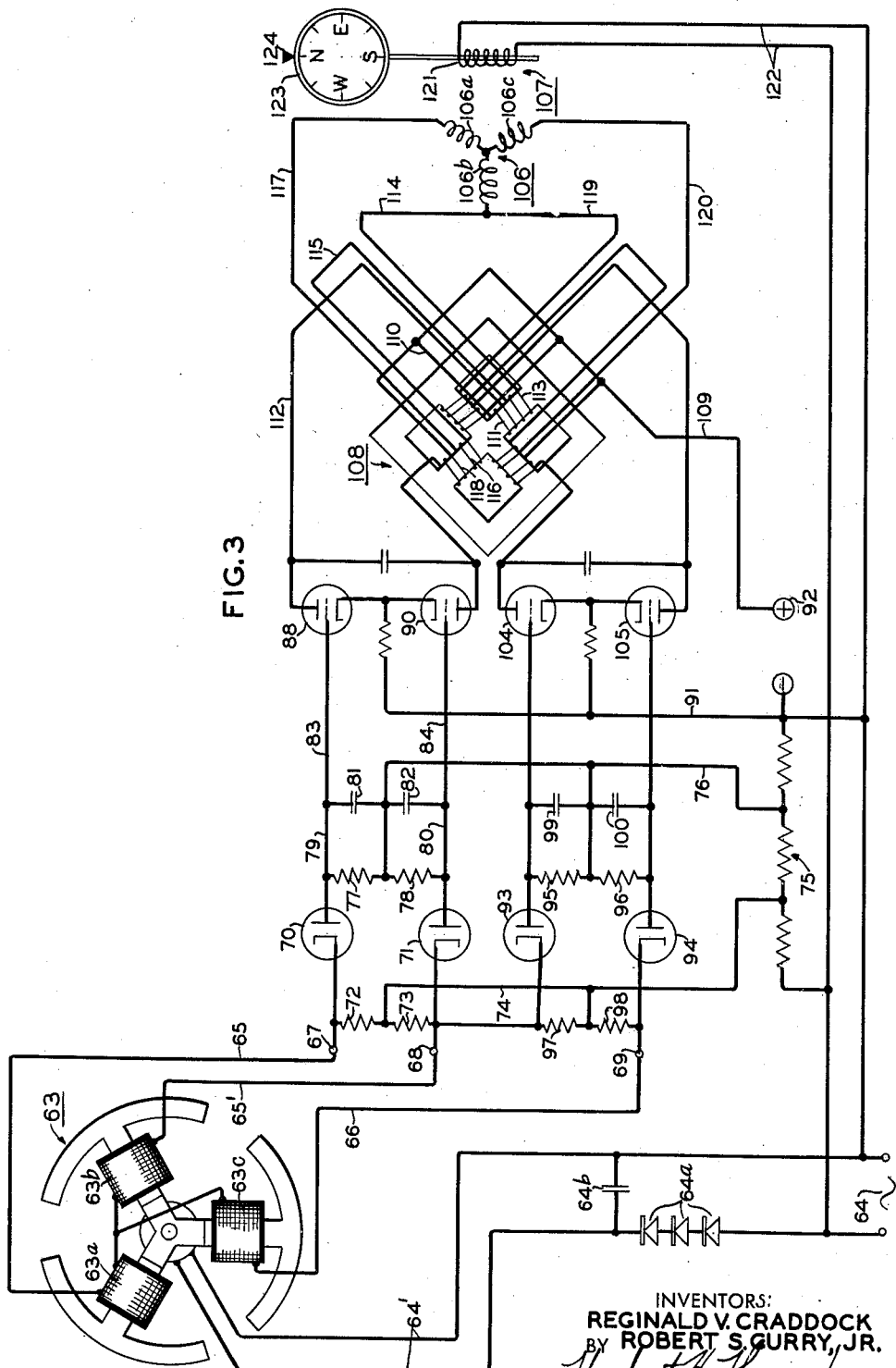

Patented July 12, 1949

2,475,593

UNITED STATES PATENT OFFICE 2,475,593

SELF-SYNCHRONOUS FLUX VALVE SYSTEM

Reginald V. Craddock, Williston Park, and Robert S. Curry, Jr., Baldwin, N. Y., assignors to The Sperry Corporation, a corporation of Delaware Application August 28, 1945, Serial No. 613,166

13 Claims. (Cl. 318—24)

Our invention relates generally to data transmission systems and to compass systems wherein indications are provided in a position remote from the transmitter or the element which is sensitive to the earth's magnetic field, and our invention particularly relates to a remote reading compass system embodying a flux valve or similar type of field-sensitive element as the transmitter or controlling member of the system.

A flux valve, as this term is used in the present specification and in the appended claims, is intended to designate a device which through interaction with a magnetic field external thereto such as the earth's field provides one or more signal voltage outputs which in magnitude and phase sense are dependent upon the position of the device in the magnetic field. Flux valves may be considered, broadly speaking, as of two types; namely, (1) one in which a null output is derived when the device occupies a predetermined position with respect to the magnetic field and (2) one which provides a plurality of voltage outputs in magnitude dependent upon the relationship between the direction of the field and preordained axes of the device. The first type, which may be called a single-legged device, is ordinarily used with some sort of follow-up device so that a predetermined direction or bearing in azimuth is determined and maintained by using the points of null or zero output from the flux valve. The latter or multilegged type flux valve is used with a repeater and is capable of providing 360° of indication.

The construction of the multilegged type of flux valve is essentially the same as the single legged type, the single leg construction being embodied in each of the legs of the multilegged type. Therefore, in connection with the following brief description of the characteristics of flux valves in general, it will be understood that the multilegged flux valve having a plurality of pickup coils, usually connected in multicircuit fashion, provides a plurality of voltage outputs, whereas the single legged flux valve provides but one, but the functional characteristics of both types are substantially identical.

Flux valves ordinarily comprise one or a plurality of core legs of high permeability magnetic material with which is associated an exciting winding and a pickup coil or coils. It is customary to excite or energize the exciting winding with alternating current, periodically varying or undulating current or pulsating currents so as to pulse the earth's field in the core. The signal voltage outputs derived from the pickup coil preferably consist solely of components produced through interaction of the device with the external magnetic or earth's field. Therefore, precautions are ordinarily employed to prevent the development of all those voltage components in the output which are produced through linkage with the exciting flux or with the exciting winding, that is, voltage components having a fundamental frequency or a frequency equal to that of the effective current employed in exciting the valve.

Additionally, harmful odd harmonics are screened from the output of the flux valve as much as possible so that the signal voltage components are what may be termed double frequency signal voltages or voltages having a frequency twice that of the current source employed in exciting the valve or twice the periodicity at which the external field is pulsed in the valve core. The desired signal voltage outputs of the flux valve are in all cases double frequency voltage components, preferably free from fundamental and those harmonics which produce wave distortion. It is very difficult, in practice, to provide a signal voltage output which is substantially a pure second harmonic and free from fundamental and odd harmonics, and because of the presence of fundamental and harmonic components the signal voltage which is applied to the associated repeater is usually of an undesirable and poor wave form, resulting in inferior and more or less inaccurate operations of the repeater.

For phase sensing purposes and to insure an unambiguous and correct operation of the repeaters, it has been customary to employ frequency doubling devices which are connected in circuit between the source of current employed in exciting the flux valve and the remote repeater. In other words, compass systems, of the character to which the present invention relates, have comprised a flux valve as the transmitter, a suitable repeater such as a Selsyn motor or the like having a compass card associated therewith, an amplifier connecting the flux valve with the repeater, and a frequency doubler.

In accordance with our invention, we propose to provide a remote reading compass system or a data transmission system in which the amplifier, connecting the flux valve, or the transmitter, and the repeater, provides a control voltage output which is free from the wave distortion present in the flux valve output thereby improving the operation of the system and its accuracy. We also provide a system in which the output voltage of the amplifier, in magnitude, varies in accordance with variations in magnitude or amplitude of the flux valve voltage output, but at one-half the frequency of the flux valve output. We also provide a system requiring no frequency doubling device, enabling the repeater to be connected directly to the source of alternating current employed in exciting the flux valve.

Additionally, by virtue of the arrangement of the components of our invention as above pointed out, it will be observed that the signal voltage output of the amplifier, which is supplied to the repeater motor, is at a lower frequency than in former systems, i. e., one-half that of the flux valve output, and therefore the torque output of the repeater is higher.

It is, therefore, the primary object of the present invention to provide a data transmission system, and, particularly, a remote reading compass system in which the control voltage output of the amplifier is free from the wave distortions present in the flux valve output.

It is a further object to provide systems or a flux valve system of the foregoing character in which the signal voltage output of the flux valve is transformed into a voltage having a corresponding amplitude but of one-half the frequency of the flux valve output voltage.

A still further object resides in providing systems of the foregoing character in which the output of the flux valve is modulated with a signal voltage of substantially one-half its frequency whereby to provide an output voltage to the repeater motor which is of the frequency of the voltage employed in exciting the flux valve and varies in amplitude in accordance with variations in amplitude of the signal voltage outputs of the flux valve.

Still another object resides in providing systems of the foregoing characters in which the signal voltage output from the flux valve is demodulated to provide a D. C. voltage which has a polarity and magnitude corresponding to the phase sense and amplitude of the voltage output of the flux valve, and in which the D. C. voltage is modulated with a voltage of the same frequency as that employed in exciting the flux valve.

Still another object resides in providing systems of the foregoing characters in which the control voltages supplied to the repeaters are of a frequency substantially equal to that of the current employed in exciting the transmitters, the transmitters being characterized by the fact that their output voltages are of a frequency twice that of the exciting current employed.

With the foregoing and still other objects in view, our invention includes the novel elements and the combinations and arrangements thereof described below and illustrated in the accompanying drawings, in which—

Fig. 3 is a wiring diagram illustrating another preferred form of a remote reading compass system.

Although, in the following, we will describe our invention in its preferred embodiments and as embodying a flux valve, it is to be understood that other types of transmitters may be employed in which the voltage outputs thereof are of a frequency differing from or twice that of the input or exciting frequency. Further, although we refer to the connecting circuit herein disclosed as an amplifying circuit, appreciable amplification therein need not necessarily be provided but additional amplifying means may be embodied in the system, and when we refer to motor means as the amplifier output-utilizing means or the repeating device, we mean to include any type of device providing a torque output or a displacement of its rotor in accordance with the control voltages applied thereto.

Figure 1:
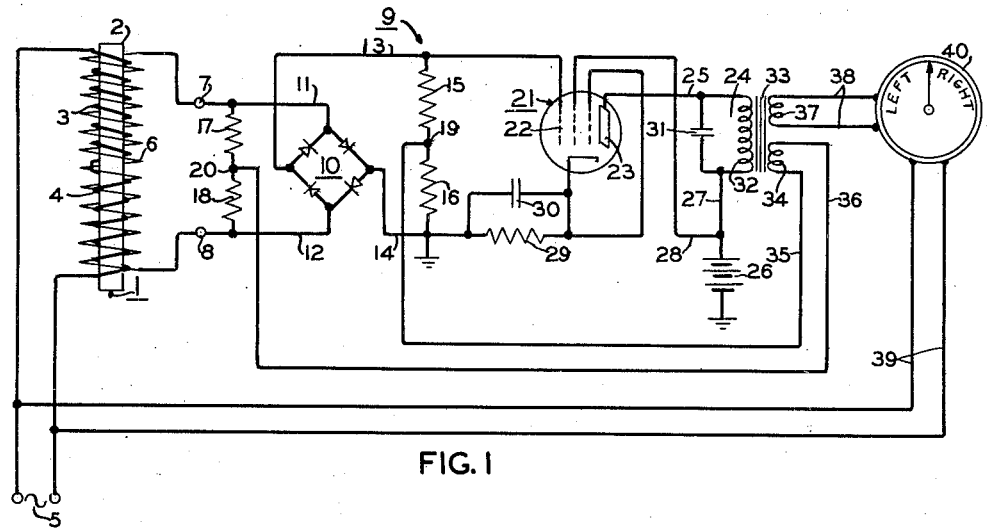
Fig. 1 is a wiring diagram of a data transmission system embodying a single legged flux valve and particularly illustrating one form of our invention.

Referring first to Fig. 1, 1 indicates generally a flux valve having a single leg or core 2 which is preferably formed of permeable magnetic material, such as "Permalloy" or the like. In the embodiment illustrated, the exciting winding comprises oppositely wound convolutions or coils 3 and 4 which are connected in series and across a source 5 of alternating current. As hereinbefore indicated, the exciting current may be pulsating or periodically varying in nature and the exciting windings 3 and 4 are oppositely wound in the manner shown so that voltage components which may be induced in the pickup winding 6 either due to linkage of exciting flux therewith or direct flux linkage between the exciting winding and pickup coil will balance out thereby reducing, as far as possible, voltage components of fundamental frequency in the pickup winding 6. Therefore, all the voltage components produced through interaction between the flux valve and the external magnetic field will appear across the output taps of the flux valve or across the terminals 7 and 8 which constitute the input to the amplifier indicated generally at 9. In other words, the useful or desirable signal voltage components derived from the flux valve, will have a frequency equal to twice the periodicity at which the external field is pulsed in the core 2 or twice the frequency of the source 5. These signal voltages vary in amplitude and phase with changes in position of the core in the earth's field or the external field to which it is subjected. Since the longitudinal axis of the flux valve core, or the axes of the legs of a multilegged core, are normally maintained horizontal or substantially horizontal through pendulous mountings and the like, the amplitude of the signal voltage outputs will depend upon the azimuthal positions of the core leg or core legs as the case may be.

The voltage output of the flux valve 1 in Fig. 1 is supplied to the input taps 7 and 8 of an amplifier or a circuit which by applying the principles of fractional frequency generation and regenerative modulation provides an output, in accordance with our present invention, having a frequency equal to one-half that of the input, but varying in amplitude with variations in amplitude of the input. The amplifier indicated generally at 9 in Fig. 1 comprises a ring modulator 10 having one diagonal connected by leads 11 and 12 to the input terminals 7 and 8 respectively. The other diagonal of the ring modulator is connected through leads 13 and 14 to opposite ends of resistors 15 and 16 which are series connected as shown. These resistors in the modulation system correspond to series resistors 17 and 18 which are connected across leads 11 and 12. Mid taps 19 and 20 between resistors 15—16 and resistors 17—18 respectively constitute conjugate input taps for the feedback loop as hereinafter described. The leads 13 and 14 are also connected in controlling relation to the electron discharge tube 21, which may, for example, be a pentode as illustrated, the lead 14 being connected to ground and the lead 13 being connected to the control grid 22 of the tube.

The plate 23 of tube 21 is connected through conductor 25 with a tuned oscillator or tank circuit 24 which is connected through lead 27 to a source of plate potential represented as battery 26. Lead 28 also connects battery 26 with the suppressor grid of the tube. The other end of the battery 26 is connected to ground as shown, and the cathode circuit of tube 21 includes the cathode resistor 29 and by-pass condenser 30 which are connected in parallel and between ground and the cathode of the tube.

The tuned oscillator circuit 24 comprises the condenser 31 and the primary 32 of a coupling transformer 33. This circuit is, in accordance with the present invention, tuned to reject frequencies other than frequencies equal substantially to one-half the frequency of the output voltages of the flux valve 1. Voltages components of the frequency to which the oscillating circuit 24 is tuned are coupled through the secondary 34 of transformer 33 into a feedback loop comprising conductors 35 and 36 which are connected respectively to the mid-tap points 19 and 20 constituting conjugate input taps to the modulator circuit.

The feedback loop functions to feedback voltage components for modulation with the input voltage. As above indicated, the feedback voltages are of a frequency equal to substantially half that derived from the flux valve. By modulating the feedback voltage with the input voltage, the output voltage components of the amplifier are of the desired fractional frequency, for example, half that of the input voltage, and additionally the amplitude of the output voltages will be proportional to the amplitude of the input voltages. Also, the feedback serves to minimize phase distortion in addition to keying in the oscillator. As a result, the amplifier will be quite linear in operation with a minimum of phase distortion.

The operation of the above described circuit will perhaps be more clearly understood if the signal voltage output of the flux valve is considered to have a frequency equal to $f$ and is applied across the ring modulator 10 as hereinabove described. When this occurs, it will be found that a voltage component will appear in the tuned oscillating circuit 24 which has a frequency equal to $f/2$. Such a voltage component will be derived from the filtering network or oscillator network 24 and applied through the feedback loop for modulation with the input voltage components having the frequency $f$. Modulation will produce side bands of frequencies $$f \pm \frac{f}{2}$$

In other words, the side bands, so derived will be of a frequency equal to $f/2$ and $3f/2$. As above indicated, of course, the $f/2$ component is derived from the filtering network and applied across the modulator. It will be noted that the feedback voltage is so applied across the modulator that it will balance out and will not appear on the grid of the tube 21. Furthermore, since the output is obtained through a modulation process involving the input wave or voltage, it will appear only when an input is applied to the circuit and will bear the fixed frequency ratio of 2:1 with respect to the input wave. By proper design, the amplitude of the output wave, that is, the voltage component having the frequency to which the oscillator or filtering network is tuned, will approximate a linear relation with the amplitude of the input wave.

Therefore, the output of amplifier 9 or the control voltage derived from the tank circuit 24 will be of a frequency equal substantially to one-half that of the output voltage of flux valve 1 or, in other words, equal to the frequency of the source 5. Furthermore, the output of amplifier 9 will vary in amplitude in accordance with variations in amplitude of the signal voltage derived from the flux valve.

These control voltages are, in the embodiment of our invention shown in Fig. 1, applied to a left-right indicator 40 by means of a second secondary winding 37 of transformer 33 which is connected through leads 38 to one coil of the meter, while the other coil of said meter is connected through leads 39 directly with source 5. The meter may be connected in this manner with source 5 because the control voltages supplied thereto from leads 38 are of the same frequency as source 5. Obviously, meter 40 provides merely an indication of the direction of the external magnetic field relative to the longitudinal axis of the core 2 of the flux valve and, if properly calibrated, a measurement of the angle therebetween. A motor, such as a two-phase motor having one phase thereof connected directly with the source 5 and its other phase connected to the leads 38 in the output of the amplifier, could be substituted for the meter 40 and arranged to orient the flux valve in azimuth in the earth's field or relative to the external magnetic field to which it is subjected; and other types of utilization devices may be substituted for meter 40 but connected in generally the same manner with the output of the amplifier and directly with the source 5.

Figure 2:
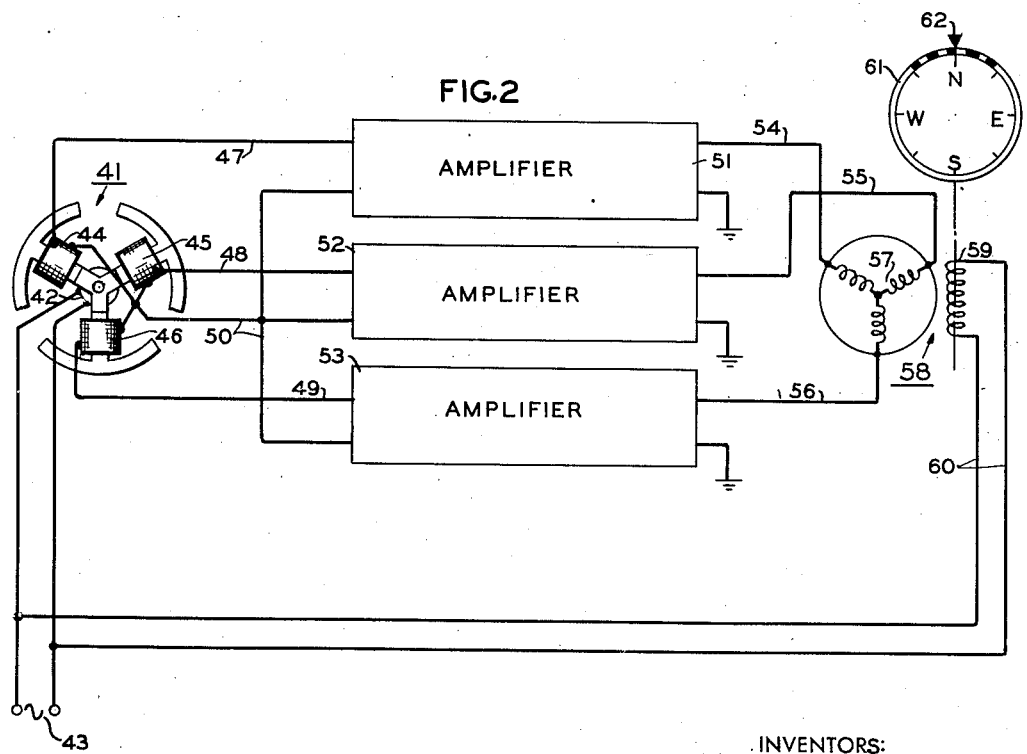
Fig. 2 illustrates somewhat schematically a compass system employing a three legged flux valve and providing 360° of indication.

In the embodiment of our invention illustrated in Fig. 2, it will be observed that we have shown a modified form of the system shown in Fig. 1 and one which is arranged to provide 360° of indication at the repeater. In this embodiment of our invention, the flux valve indicated generally at 41 is of the multilegged type comprising three relatively angularly arranged core legs having an exciting winding 42 centrally disposed with respect to the core structure and arranged to pulse the external field or earth's field in all three of the core legs. The exciting coil 42 may be connected with the alternating current source 43 as indicated. Each of the core legs is provided with a pickup winding as shown and indicated at 44, 45 and 46, these windings being connected together in multicircuit fashion (resembling a Y-connected, three-phase winding), and through leads 47, 48, 49 and 50 with suitable amplifiers indicated generally at 51, 52 and 53 which may be of the character of that illustrated in detail in Fig. 1. Obviously, the interconnection of the pickup coils may be in delta fashion rather than in Y and, furthermore, two amplifiers or amplifier channels may be employed instead of three. In the latter case, an open delta connection of the pickup coils may be used. The outputs of the amplifiers 51, 52 and 53 are connected through leads 54, 55 and 56 with the polycircuit stator winding 57 of a repeater 58. The repeater motor 58 may be of the Selsyn type or any other desired conventional form, and the stator windings thereof may be connected in polycircuit fashion in the same manner as the pickup coils of the flux valve.

Since the control voltage components supplied to the stator winding of the repeater 58 are of substantially the same frequency as that of the current source 43, the single circuit rotor winding 59 of the repeater motor may be directly connected through leads 60 with the source 43 as shown. The output voltages of the amplifiers 51, 52 and 53 will be of a frequency equal to one-half the frequency of the signal voltages derived from the flux valve, and the amplitudes thereof will depend upon the positions of the legs of the flux valve in the external field. Therefore, the rotor of repeater 58 will assume a position which is dependent upon the position of the flux valve 41 in, for example, the earth's field and, correspondingly, will position a compass card 61 relative to a suitable lubber line 62 thereby affording a remote compass indication.

In amplifiers of the character of those described in connection with Figs. 1 and 2, it has been found that the ability to produce the half frequency voltage component is not seriously affected by considerable amounts of distortion in the input wave or by extraneous frequencies such as noise. The wave form of the output is therefore somewhat improved. Furthermore, it is to be noted that it is desirable to make the loss in the network in the modulator balance greater than the gain of the amplifier so that the attainment of an oscillating condition in the circuit is prevented.

In the embodiment of our invention illustrated in Fig. 3, we have shown a system which is characterized by the fact that the wave form of the control voltages supplied to the repeater motor is independent of and free from distortions or irregularities including extraneous frequencies appearing in the outputs of the flux valve whereby improved and more accurate operations of the repeater are produced.

The system illustrated in Fig. 3 includes a multilegged flux valve which may be of the general character of that shown in Fig. 2, and is indicated generally at 63. The exciting winding of this flux valve is connected with the source 64 of alternating current, and the three pickup windings 63a, 63b and 63c are connected together in multicircuit fashion and through leads 65, 65' and 66 with the input terminals 67, 68 and 69 of a two-channel amplifier, the input terminal 68 being common to both channels.

In order to provide phase-sensitive rectification of the signal voltage outputs of the flux valve where diodes are employed, as in the embodiment of our invention illustrated in Fig. 3, and where they are energized from a source of alternating current such as source 64, we prefer to connect in one of the leads 64' a rectifying means such as a series of oxide rectifiers 64a which function to provide half-wave excitation of the flux valve. Additionally, a condenser 64b is preferably connected across the leads 64' for the purpose of sustaining the unidirectional pulse derived from the rectifiers, and this condenser may also be used for phasing purposes.

Proceeding first in the description of one channel, the input terminals 67 and 68 are connected respectively with the cathodes of diode tubes 70 and 71 and these cathodes are connected in balanced relation through resistors 72 and 73 and through lead 74 with a voltage divider indicated generally at 75. The voltage divider is preferably connected across the alternating current source 64 and is also connected with the plates of tubes 70 and 71 through the lead 76 and plate resistors 77 and 78. Tubes 70 and 71 function as phase-sensitive rectifiers to supply a D. C. or unidirectional voltage across the output leads 79 and 80 of the above-described stage of our amplifier, which voltage corresponds in magnitude to the resultant of the voltages appearing across the pickup coils 63a and 63b of the flux valve and has a polarity depending upon the phase sense of the resultant of said voltages. Smoothing condensers 81 and 82, which are connected across the leads 79 and 80, serve to smooth out the resulting D. C. or unidirectional voltage. This voltage is impressed through leads 83 and 84 across the control electrodes or grids of tubes 88 and 90 comprised in a modulating stage.

The output voltage of the rectifier stage, as above described, is applied differentially to the grids or control electrodes of modulating tubes 88 and 90 while an A. C. bias voltage is applied between the cathode and grids of these tubes by means of lead 91 which is connected with one side of the A. C. source 64 and with the cathodes of said modulating tubes and through the lead 76, above described, which is connected with the grids of these tubes. The plates of these tubes are connected with a suitable source of plate potential indicated generally at 92 and in a manner hereinafter described so that the output of tubes 88 and 90 will comprise an alternating voltage which is of the frequency of the source 64, but, in amplitude, proportional to the magnitude of the integrated D. C. voltages applied to the grids thereof. Hence, the outputs of the modulator stage or tubes 88 and 90 will be a control signal which is applied as hereinafter described to the stator windings of a repeater motor, which voltages are of the same frequency as the source 64 and which vary in amplitude in correspondence with average variations in amplitude of the signal voltages derived from the flux valve.

The second channel of the amplifier circuit shown in Fig. 3 is in all material respects similar to the channel above discussed. In other words, input terminals 68 and 69, across which the signal voltage outputs from flux valve coils 63b and 63c are impressed, are connected with the cathodes of diodes 93 and 94. These rectifying tubes are similarly connected to the voltage divider 75 through leads 76 and 74, lead 76 being connected with the plates through plate resistors 95 and 96 and lead 74 being connected with the cathode resistors 97 and 98. Smoothing or filtering condensers 99 and 100 are connected across the outputs of these tubes and the D. C. or unidirectional voltage is differentially applied to the grids of the modulating tubes 104 and 105 which supply a control voltage output in the same manner as modulating tubes 88 and 90, which is of the frequency of the current source 64 but varies in amplitude in correspondence with variations in average amplitude of the signal voltages derived from the pickup windings 63b and 63c of the flux valve.

In the embodiment of our system shown in Fig. 3, the outputs of the modulating stages are coupled with the Y-connected stator windings 106 of repeater 107 by means of a transformer indicated generally at 108. As will be observed, the plate potentials are supplied from the source 92 to the plates of the respective tubes through various leads which include primary windings on the core of the transformer. For example, lead 109 connecting with plate potential source 92 also connects through lead 110, winding 111 and lead 112 with the plate of tube 88. In conjunction with this transformer primary winding 111, a secondary winding 113 is mounted on the same leg of the transformer core and connects through lead 114 with one of the windings 106b of the stator 106. The secondary winding 113 is also connected through lead 115 with a second secondary winding 116 which is connected through lead 117 to a second winding 106a of stator 106. The first and second-mentioned windings, 106b and 106a, of the stator 106 are connected together and in a Y-connection with the third stator winding 106c. Hence, the resultant of the voltages induced in secondary windings 113 and 116 of coupling transformer 108 is impressed across said two windings 106b and 106a. The primary winding of the transformer which cooperates with secondary winding 116 is indicated at 118 and is connected between the plate of tube 90 and the common lead 109. In other words, the differential voltage output from tubes 88 and 90 is applied through the transformer 108 across windings 106a and 106b of the stator of repeater motor 107. Since the input to the channel of the amplifier including modulating tubes 88 and 90 is derived from the pickup coils 63a and 63b of the flux valve, the voltage across the windings 106a and 106b of the repeater will be dependent upon or will correspond to those voltages derived from the pickup coils 63a and 63b of the flux valve.

Similarly, the plate circuits of modulating tubes 104 and 105 include those primary windings on the core of transformer 108 which are coupled with the secondary windings which function through leads 119 and 120 to impress voltages across the windings 106b and 106c of the stator of the repeater which correspond to the signal voltages derived from the pickup coils 63b and 63c of the flux valve.

Since the control voltages applied to the stator windings of the repeater 107 are of the frequency of the current source 64, the single circuit rotor winding 121 of the repeater may be connected directly as shown through leads 122 with the alternating current source 64 and the repeater, like that shown in Fig. 2, is adapted to control or rotate a compass card 123 which cooperates with a lubber line 124 to provide azimuthal bearings or directional indications.

In operation, of course, the flux valves of the systems shown in Figs. 2 and 3 are preferably pendulously mounted on a craft so as to be subjected substantially only to the horizontal component of the earth's magnetic field. The repeaters 58 or 107 or a plurality of such repeaters are located at desired points on the craft, and for all movements of the craft in azimuth the compass card will remain substantially stationary in space thereby, in cooperation with the lubber line which moves in azimuth with the craft, providing bearings or azimuthal indications. Particularly in connection with the system shown in Fig. 3, it should be understood that the repeater 107 will not oscillate to any marked extent because of spurious components in the signal voltages, but will provide accurate and smooth operations of the repeater because of the improved wave form of the control voltages supplied to the repeater motor.

In the drawings and foregoing description of Fig. 3, we have, for exemplary purposes, illustrated and described the use of a half-wave rectifier as a means of exciting the flux valve with current of a frequency substantially one-half that of source 64. It is, of course, to be understood that we may and preferably do employ a frequency fractionating circuit such as an oscillator or any other conventional frequency generator which is keyed to source 64 so that the phase relation of its output, which is used to excite the flux valve, is substantially fixed with respect to that of source 64 but the frequency of its output is one-half that of source 64. An example of such a frequency fractionating circuit is the amplifier 9 shown in Fig. 1. With this arrangement, the current employed in exciting the flux valve is full wave at one-half the frequency of the source thereby providing a flux valve output of desired frequency and relatively good wave form for phase sensitive demodulation at the frequency of the source.

The unidirectional voltage components which are, in magnitude and polarity, proportional to the amplitude and dependent upon the phase sense of the alternating signal voltage outputs of the flux valve, may be applied to a suitable type of direct current motor to control the operation thereof in substantially the same manner as above described in connection with the modulation voltage components. In this case, the motor may preferably include a permanent magnet armature and field coils corresponding in number and relative relation to the pickup coils of the flux valve.

While we have described our invention in its preferred embodiments it is to be understood that the words which we have used are words of description rather than of limitation and that changes within the purview of the appended claims may be made without departing from the true scope and spirit of our invention in its broader aspects. Thus, the devices 58 or 107 could be used as conventional signal transformers instead of motors in which case, the rotor winding, of course, is not energized from a voltage source but a signal voltage is derived therefrom.

What is claimed is:

1. A system of the character described comprising means for supplying periodically varying signal voltage outputs dependent in phase and magnitude upon the position of said means in an external magnetic field and means for periodically pulsing the external field therethrough at a given, first periodicity, the signal voltage outputs having a periodicity twice that of said first periodicity, motor means and a source of periodically varying voltage varying at a second periodicity and connected with said motor means, means for demodulating the signal voltage outputs, means for modulating the demodulation components with voltage components from said source, and means for supplying the modulation voltage components to said motor means.

2. A flux valve system of the character described comprising a flux valve for supplying periodically varying signal voltage outputs, a source of periodically varying voltage connected with said flux valve for exciting the same, motor means connected with said source, means for demodulating said signal voltage outputs, means for modulating the demodulation components with voltage components from said source, and means for supplying the modulation voltage components to said motor means.

3. A flux valve system comprising a flux valve having a plurality of relatively angularly arranged core legs, a pickup coil mounted on each of said core legs and connected together in polycircuit fashion and means including a source of alternating current for exciting said flux valve, a repeater motor having a polycircuit stator winding and a single circuit rotor winding, said rotor winding being connected with said alternating current source for excitation at the frequency of said source, and frequency-halving means connecting the flux valve and stator winding of said repeater for supplying to said stator winding voltage components varying in amplitude with variations in amplitude of the signal voltage outputs of said flux valve but of a frequency substantially equal to that of said current source.

4. A system of the character described comprising a flux valve having a core of permeable magnetic material, means for periodically pulsing an external magnetic field in said core and a pickup coil associated with said core for supplying signal voltage outputs having a periodicity substantially twice that at which the external field is pulsed in said core and of a magnitude and phase sense dependent upon the position of the core in the external field, motor means having a plurality of field windings, a source of periodically varying current having a periodicity substantially equal to that at which the field is pulsed in the core of said flux valve, said current source being connected to one of the fields of said motor means, and means connected between said flux valve and the other field winding of said motor for supplying voltage thereto having a frequency substantially one-half the frequency of the signal voltage outputs of said flux valve but varying in amplitude in accordance with variations in amplitude of said flux valve signal voltage outputs.

5. A system of the character described comprising means for supplying signal voltage outputs dependent in phase and magnitude upon the position thereof in an external magnetic field, periodically varying exciting means for rendering said means field responsive, said exciting means having a given periodicity and said signal voltage outputs having a periodicity twice that of said exciting means, modulating means including means for deriving a voltage component of half the frequency of its input voltage for modulating said component with said input voltage whereby to supply an output voltage having one half the frequency of the input and varying in amplitude in accordance with variations in amplitude of said input, said modulating means having its input connected to receive the voltage outputs of said field-sensitive means, motor means connected to receive the output of said modulating means, and a source of periodically varying current having a periodicity equal to that of said exciting means, said motor being connected for excitation by said current source.

6. A flux valve system comprising a flux valve having a core of permeable magnetic material, a pickup coil adapted to provide periodically varying voltage outputs dependent in magnitude and phase upon the position of said valve in an external magnetic field and exciting means for periodically pulsing an external magnetic field in said core, said pulsating voltage outputs having a periodicity twice that at which the external field is pulsed, modulating means comprising means for deriving a voltage component of half the frequency of its input voltage and means for modulating said component with said input voltage whereby to supply an output voltage having one-half the frequency of the input and varying in amplitude in accordance with variations in amplitude of said input, said modulating means having its input connected to receive the voltage outputs of said field-sensitive means, motor means connected to receive the output of said modulating means, and a source of periodically varying current having a periodicity substantially equal to that at which the external field is pulsed, said motor being connected for excitation with said current source.

7. A flux valve system comprising a flux valve having a core of permeable magnetic material, a pickup coil adapted to provide alternating voltage outputs dependent in magnitude and phase upon the position of said core in the earth's magnetic field and means including an alternating current source for pulsing the earth's field in said core, the voltage outputs of said flux valve having a periodicity substantially twice that of said alternating current source, modulating means comprising means for deriving a voltage component of half the frequency of its input voltage and means for modulating said component with said input voltage whereby to supply an output voltage having one-half the frequency of the input and varying in amplitude in accordance with variations in amplitude of said input, said modulating means having its input connected to receive the voltage outputs of said flux valve, and motor means connected to receive the output of said modulating means, said motor being connected for excitation with said alternating current source.

8. A flux valve system comprising a flux valve including a core, means including a source of alternating current for periodically pulsing an external magnetic field in said core, and a pickup coil adapted to supply signal voltage outputs having a periodicity twice that at which the external field is pulsed and having a magnitude and phase sense dependent upon the position of said core in the external field, modulating means having its input connected to receive the voltage outputs of said flux valve and a feedback loop including a circuit tuned to pass voltage components from the output of said modulating means having a frequency substantially equal to one-half that of the input, and a motor connected to receive voltage components from the output of said modulating means having said half frequency, said motor being connected for excitation with said alternating-current source.

9. A flux valve system comprising a flux valve having a plurality of core legs relatively angularly arranged, means including an alternating-current source for periodically pulsing the earth's field in said core legs and a plurality of pickup coils associated with the respective legs and connected together in polycircuit fashion to provide a plurality of voltage outputs dependent in magnitude and phase sense upon the positions of the associated core legs in the earth's field, modulating means connected in polycircuit fashion to receive the voltage outputs of said flux valve and including means for deriving voltage components of half the frequency of the input voltage and means for modulating said components with said input voltages, whereby to supply output voltages of a frequency substantially one-half that of the input voltages and varying in amplitude in accordance with variations in amplitude of the corresponding input voltages, and motor means connected with the output of said modulating means and with said alternating current source.

10. A system of the character recited in claim 1 in which the motor means comprises a pair of field windings, one thereof being connected to the output of the modulator and the other field winding being connected to the source of periodically varying current.

11. A flux valve system of the character recited in claim 5 in which the motor comprises a polycircuit stator winding and a single circuit rotor winding, said polycircuit winding being connected in polycircuit fashion to the output of the modulating means and the rotor winding being connected to the source of periodically varying current.

12. A flux valve compass system comprising a flux valve having a plurality of core legs, means including an alternating-current source for exciting said flux valve and a plurality of pickup coils respectively associated with said core legs and connected together in polycircuit fashion to provide a plurality of signal voltage outputs having a frequency twice that of said current source, a repeater including a polycircuit stator winding and a single circuit rotor winding, modulating means for connecting said stator winding of the repeater in polycircuit fashion with the pickup coils of said flux valve, said modulating means comprising means for supplying to the stator winding of said repeater voltage components of the same frequency as said current source but varying in amplitude in accordance with variations in amplitude of the flux valve voltage outputs, the rotor winding of said repeater being connected directly with said current source.

13. A system of the character described comprising a flux valve for supplying signal voltage outputs, a source of alternating current connected to excite said flux valve, a motor having a plurality of windings, one of said windings being connected for excitation by said current source, and means electrically connecting the output of said flux valve in controlling relation to another of said motor windings, said last mentioned means including frequency-halving means for transforming the control voltage inputs thereto to voltage outputs of substantially one-half the frequency of the input voltages and of an amplitude proportional to the amplitude of the input voltages.

REGINALD V. CRADDOCK.
ROBERT S. CURRY, Jr.

REFERENCES CITED

The following references are of record in the file of this patent:

UNITED STATES PATENTS

| Number | Name | Date |
|---|---|---|
| 2,159,595 | Miller | May 23, 1939 |
| 2,383,459 | Beach | Aug. 28, 1945 |